(12) United States Patent
Umeh et al.

(10) Patent No.: US 7,966,801 B2
(45) Date of Patent: Jun. 28, 2011

(54) APPARATUS AND METHOD FOR GAS TURBINE ACTIVE COMBUSTION CONTROL SYSTEM

(75) Inventors: Chukwueloka Umeh, Schenectady, NY (US); Leonardo C. Kammer, Niskayuna, NY (US); Minesh Shah, Clifton Park, NY (US); Jeffrey B. Fortin, Niskayuna, NY (US); Aaron Knobloch, Mechanicville, NY (US); William J. Myers, West Chester, OH (US); Alfred Albert Mancini, Cincinnati, OH (US)

(73) Assignee: General Electric Company, Niskayuna, NY (US)

( * ) Notice: Subject to any disclaimer, the term of this patent is extended or adjusted under 35 U.S.C. 154(b) by 1170 days.

(21) Appl. No.: 11/567,950

(22) Filed: Dec. 7, 2006

(65) Prior Publication Data

US 2008/0134684 A1 Jun. 12, 2008

(51) Int. Cl.
*F02C 9/00* (2006.01)
(52) U.S. Cl. .................... 60/39.281; 60/776
(58) Field of Classification Search .......... 60/39.091, 60/39.281, 39.24, 772, 776; 701/100; 431/114
See application file for complete search history.

(56) References Cited

U.S. PATENT DOCUMENTS

| | | | | |
|---|---|---|---|---|
| 2,766,583 A * | 10/1956 | Schirmer | ............... | 60/39.281 |
| 4,508,127 A * | 4/1985 | Thurston | ............... | 137/8 |
| 5,349,811 A * | 9/1994 | Stickler et al. | ............... | 60/776 |
| 5,428,951 A * | 7/1995 | Wilson et al. | ............... | 60/776 |
| 5,544,478 A * | 8/1996 | Shu et al. | ............... | 60/773 |
| 5,581,995 A * | 12/1996 | Lucenko et al. | ............... | 60/779 |
| 5,665,916 A * | 9/1997 | Puster et al. | ............... | 73/590 |
| 5,706,643 A * | 1/1998 | Snyder et al. | ............... | 60/776 |
| 5,755,090 A * | 5/1998 | Hu | ............... | 60/39.091 |
| 5,791,889 A * | 8/1998 | Gemmen et al. | ............... | 431/1 |
| 5,932,940 A * | 8/1999 | Epstein et al. | ............... | 310/40 MM |
| 6,336,806 B1 * | 1/2002 | Paschereit et al. | ............... | 431/1 |
| 6,530,228 B2 * | 3/2003 | Wilson et al. | ............... | 60/776 |
| 6,601,393 B2 * | 8/2003 | Wilson et al. | ............... | 60/776 |
| 2005/0056024 A1 * | 3/2005 | Lieuwen et al. | ............... | 60/776 |
| 2005/0058958 A1 * | 3/2005 | Kobayashi et al. | ............... | 431/10 |
| 2005/0274116 A1 * | 12/2005 | Thornton et al. | ............... | 60/776 |
| 2005/0278108 A1 * | 12/2005 | Norman et al. | ............... | 701/100 |

* cited by examiner

*Primary Examiner* — Michael Cuff
*Assistant Examiner* — Phutthiwat Wongwian
(74) *Attorney, Agent, or Firm* — Richard A. DeCristofare (57) ABSTRACT

An Active Combustion Control System and method provides for monitoring combustor pressure and modulating fuel to a gas turbine combustor to prevent combustion dynamics and/or flame extinguishments. The system includes an actuator, wherein the actuator periodically injects pulsed fuel into the combustor. The apparatus also includes a sensor connected to the combustion chamber down stream from an inlet, where the sensor generates a signal detecting the pressure oscillations in the combustor. The apparatus controls the actuator in response to the sensor. The apparatus prompts the actuator to periodically inject pulsed fuel into the combustor at a predetermined sympathetic frequency and magnitude, thereby controlling the amplitude of the pressure oscillations in the combustor by modulating the natural oscillations.

6 Claims, 12 Drawing Sheets

FIG. 6
TAPS Combustion System Proposed Architecture A

FIG. 7
TAPS Combustion System Proposed Architecture B

Harmonics: 558, 1115, 1670 Hz
Summations: 172+387= 559 Hz
558+387= 945 Hz
945+172=1117 Hz
945+558=1503 Hz
1503+558=2061 Hz

—— no forcing
········ 130 Hz forcing
—— no forcing

FIG. 9E

- FFT at: 26-27s; 67-68s; 94-95s
- Square wave forcing @ 1 Hz, 130 Hz, 140 Hz:
- Frequency shifts from ~570Hz to ~130Hz. Induced low freq persists after forcing stopped and higher freq started growing.

Conditions
- P3 = 190 psig; T3 = 704°F; FAR 0.029

— KP 34-35s –11c1
······ KP 61-62s –11c2
— Valve –11c3

Square wave forcing @ 143 Hz
P3 = 190 psig
T3 = 698°F

APPARATUS AND METHOD FOR GAS TURBINE ACTIVE COMBUSTION CONTROL SYSTEM

STATEMENT REGARDING FEDERALLY SPONSORED RESEARCH & DEVELOPMENT

This invention was developed with U.S. Government support under U.S. Government Contract No. NAS 3-01135 awarded by the National Aeronautics and Space Administration (NASA) and is subject to the provisions of Section 305 of the National Aeronautics and Space Act of 1958 (42 U.S. C. 2457). The U.S. Government may have certain rights in this invention.

BACKGROUND OF THE INVENTION

1. Field of the Invention

The present invention relates to controlling combustion in a combustion chamber or combustor.

2. Description of the Related Art

Air pollution concerns worldwide have led to stricter emissions standards both domestically and internationally. Aircraft emissions are governed by both Environmental Protection Agency (EPA) and International Civil Aviation Organization (ICAO) standards. These standards regulate the emission of oxides of nitrogen (NOx), unburned hydrocarbons (UHC), and carbon monoxide (CO) from aircraft in the vicinity of airports, where they contribute to urban photochemical smog problems. Many aircraft engines are able to meet current emission standards using combustor technologies and theories proven over the past 50 years of engine development. However, stricter engine emissions standards will not be within the capability of current combustor technologies.

In general, engine emissions fall into two classes: those emissions formed because of high flame temperatures (NOx), and those emissions formed because of low flame temperatures which do not allow the fuel-air reaction to proceed to completion (UHC & CO).

A small window exists where both pollutants are minimized. For this window to be effective, however, the reactants must be well mixed, so that burning occurs evenly across the mixture without hot spots, where NOx is produced, or cold spots, when CO and UHC are produced. Hot spots are produced where the mixture of fuel and air is near a specific ratio when all fuel and air react (i.e. no unburned fuel or air is present in the products). This mixture is called stoichiometric. Cold spots can occur if either excess air is present (called lean combustion), or if excess fuel is present (called rich combustion).

Modern gas turbine combustors consist of between 1 and 30 or more mixers, which mix high velocity air with a fine fuel spray. These mixers usually consist of a single fuel injector located at a center of a swirler for swirling the incoming air to enhance flame stabilization and mixing. Both the fuel injector and mixer are located on a combustor dome plate or cap.

In general, the fuel to air ratio in the mixer is rich. Since the overall combustor fuel-air ratio of gas turbine combustors is lean, additional air is added through discrete dilution holes prior to exiting the combustor. Poor mixing and hot spots can occur both at the dome, where the injected fuel must vaporize and mix prior to burning, and in the vicinity of the dilution holes, where air is added to the rich dome mixture. In addition, many propulsion systems, such as those used in various tactical missile systems, involve an enclosed combustor.

Combustion instabilities are commonly encountered in low emissions gas turbine engines. Combustion dynamics in the form of fluctuations in pressure, heat-release rate, and other perturbations in flow may lead to problems such as structural vibration, excessive heat transfer to a chamber, and consequently lead to failure of the system. There are two basic methods for controlling combustion dynamics in a combustion system: passive control and active control. As the name suggests, passive control refers to a system that incorporates certain design features and characteristics to reduce dynamic pressure oscillations. Active control, on the other hand, incorporates a sensor or sensors to detect dynamics (e.g., pressure sensor to detect pressure fluctuations) and to provide a feedback signal which, when suitably processed by a controller, provides an input signal to a control device. The control device in turn operates to reduce the combustion instabilities.

The combustion characteristics of an enclosed combustor, including flammability limits, instability, and efficiency are closely related to the interaction between shear flow dynamics of the fuel and air flow at the inlet and acoustic modes of the combustor. Strong interaction, between the acoustic modes of the combustor and the airflow dynamics may lead to highly unstable combustion. Specifically, unstable combustion may occur when the acoustic modes of the combustor match the instability modes of the airflow. For such conditions, the shedding of the airflow vortices upstream of the combustor tends to excite acoustic resonances in the combustion chamber, which subsequently cause the shedding of more coherent energetic vortices at the resonant frequency. The continued presence of such vortices provides a substantial contribution to the instability of the combustion process.

In a jet of fluid that exits from a conduit to a surrounding medium of another fluid, sudden increase of the mass-flow leads to formation of well-defined vortices that dominate the boundary between the jet fluid and the surrounding fluid. Because these vortices help transport chunks of fluid over a large distance, the rate of turbulent mixing between the two fluids is closely linked to the dynamics of these vortices. One way to manipulate the dynamics of vortices is to modulate periodically the instantaneous mass-flux of the jet.

In combustion devices, actuators can be used to enhance combustion performance such as efficiency improvement, pollutant reduction, flammability extension, and instability suppression. Combustion apparatuses, which use actuators have been disclosed. One such disclosure includes several active control devices, including loudspeakers to modify the pressure field of the system or to obtain gaseous fuel flow modulations, pulsed gas jets aligned across a rearward facing step, adjustable inlets for time-variant change of the inlet area of a combustor, and solenoid-type fuel injectors for controlled unsteady addition of secondary fuel into the main combustion zone.

The periodic shedding of vortices produced in highly sheared gas flows has been recognized as a source of substantial acoustic energy for many years. For example, experimental studies have demonstrated that vortex shedding from gas flow restrictors disposed in large, segmented, solid propellant rocket motors couples with the combustion chamber acoustics to generate substantial acoustic pressures. The maximum acoustic energies are produced when the vortex shedding frequency matches one of the acoustic resonances of the combustor. It has been demonstrated that locating the restrictors near a velocity antinode generated the maximum acoustic pressures in a solid propellant rocket motor, with a highly sheared flow occurring at the grain transition boundary in boost/sustain type tactical solid propellant rocket motors.

Lean running engines tend to have flame extinguishment (also known as Lean Blow Out or LBO) or large pressure dynamics (known as combustion dynamics) inside the combustor that can be detrimental to engine operation and long term reliability. Lean premixed gas turbine combustors are prone to pressure fluctuations called combustion dynamics. Combustion dynamicsis a result of interaction between heat release from combusting fuel-air mixture and pressure oscillations in the combustion chamber. This phenomenon can result in expensive damage to combustor and or the gas turbine system hardware.

Therefore, there exists a need for a control system for combustors to operate near LBO boundaries without the risk of crossing the LBO boundary and also to near-simultaneously reduce combustion dynamics.

BRIEF DESCRIPTION OF THE INVENTION

In accordance with one embodiment of the present invention, an apparatus for active modulation of a flame in a combustor having instabilities, is provided. The apparatus includes an actuator, wherein the at least one actuator periodically pulses a fraction of the fuel flow delivered to the combustor. The apparatus also includes at least one sensor connected to the combustion chamber, wherein the sensor generates a signal in response to instabilities in the combustor. Lastly, the apparatus includes means for controlling the actuator in response to the sensor signals. The means for controlling prompts the actuator to periodically inject pulsed fuel into the combustor at a predetermined sympathetic frequency and magnitude, thereby controlling the amplitude of the oscillations in the combustor.

In accordance with another embodiment of the present invention, a method for active gas turbine combustion control of a combustor is provided. The method includes sensing a combustion dynamic signal and determining a sound pressure level associated with the combustion dynamic signal. The method performs a spectral analysis of the combustion dynamic signal and determines if the sound pressure level exceeds a predetermined threshold. The method then determines from the spectral analysis a plurality of sympathetic frequencies associated with the combustion dynamic signal and directs a MEMS actuator to inject pulsed fuel into the combustor in accordance with the sympathetic frequencies.

The invention is also directed towards an active combustion control (ACC) system for near simultaneously balancing lean blow out avoidance, combustor dynamics mitigation, and combustor operability. The ACC includes a combustor pressure sensor and a fuel modulating system for providing fuel to a combustor. The fuel modulation system further includes a MEMS microvalve for providing a predetermined fraction of the total combustion fuel flow upstream of at least one corresponding pilot fuel nozzle and at least one fuel flow sensor. The ACC also includes a combustion dynamics control system for receiving input from the combustor pressure sensors and providing combustion dynamics control signals to the fuel modulating system for modulating fuel to the combustor at a frequency and amplitude derived from determined sympathetic frequencies to reduce or cancel combustion dynamics. The ACC also includes a lean blow out (LBO) control system for receiving input from the combustor pressure sensors and providing a LBO control signal to the fuel modulating system for modulating fuel to the combustor at a frequency and amplitude derived from determined sympathetic frequencies to prevent lean blow out.

BRIEF DESCRIPTION OF THE DRAWINGS

FIG. 6 includes a pump 306, fuel nozzle control 504, and series of MEMs 202. The system includes forty CPFN valves and twenty MEMs valves as shown in the FIG. 6. The other elements and sub-elements illustrated in FIG.6 are self explanatory for explaining the various embodiments of the invention.

FIG. 7 includes a pump 306, fuel nozzle control 504, and series of MEMs 202. The system further includes forty CPFN valves and twenty MEMs valves as shown in the FIG. 7. The other elements and sub-elements illustrated in FIG. 7 are self explanatory for explaining the various embodiments of the invention.

DETAILED DESCRIPTION OF THE INVENTION

Figure 1:
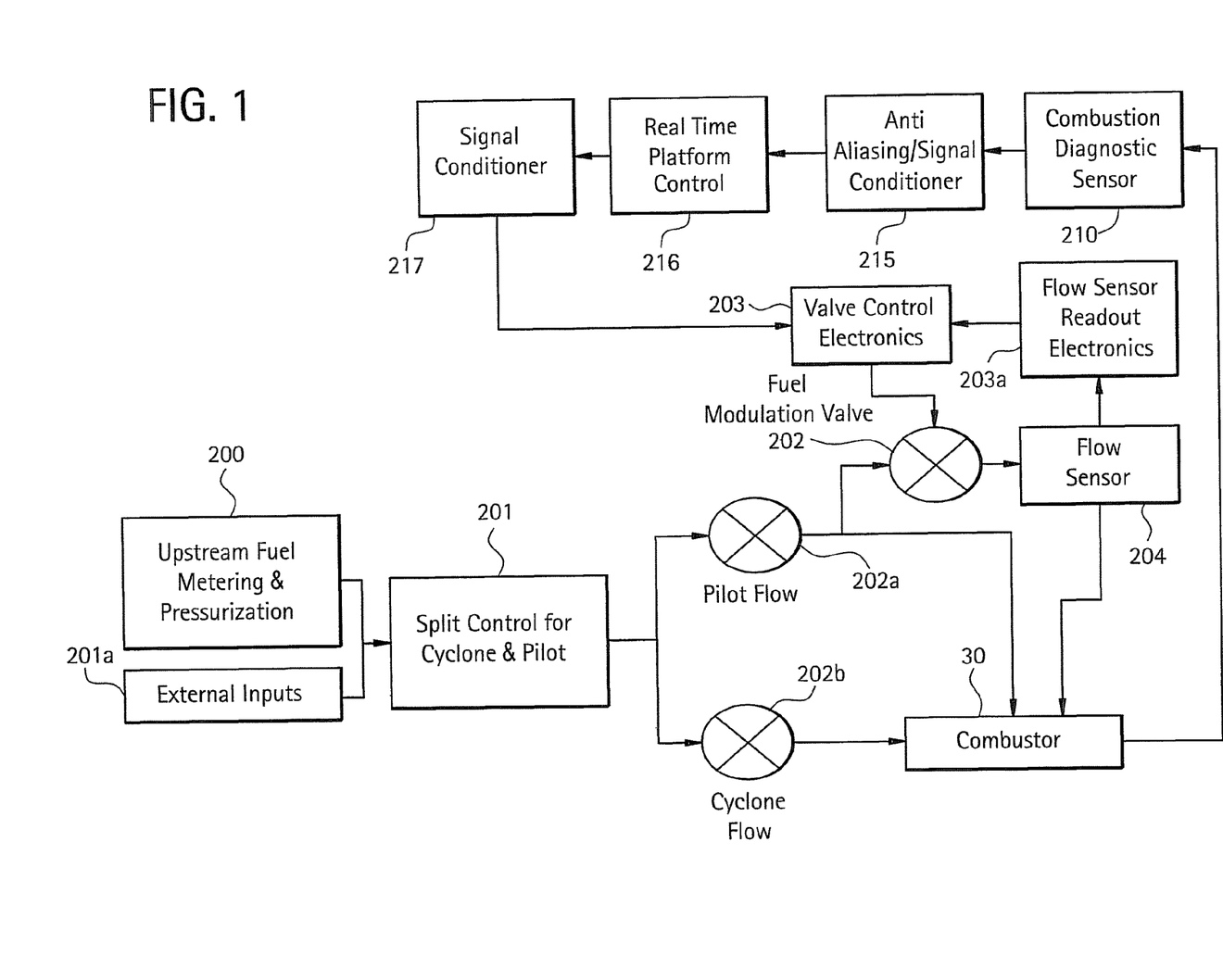
FIG. 1 is an illustration of the high level architecture of the Active Combustion Control System utilizing fuel modulation system in accordance with an embodiment of the present invention.

Referring to FIG. 1, the ACCS employing fuel flow modulation system includes an upstream fuel metering & pressurization system 200, a split controller 201 for splitting fuel flow between cyclone valve 202b & pilot valve 202a, including suitable external inputs 201A, a fuel modulation valve 202, Valvevalve control electronics 203, and a fuel flow sensor 204. It will be appreciated that the fuel flow sensor 204 may be any type of suitable sensor such as a volumetric or mass fuel flow sensor. It will also be appreciated the sensor approaches may include piezoresistive cantilever, coriolis or anemometer approaches. Also shown in FIG. 1 is a combustion diagnostic sensor 210. Combustion diagnostic sensor 210 may include any suitable sensor such as a combustor dynamic pressure sensor, a combustor pressure sensor, a heat release sensor, an emissions sensor, and a Fuel to Air Ratio (F/A) measurement sensor located downstream of nozzle before flame. The system shown in FIG. 1 includes an anti-aliasing/signal conditioning device 215, a real time control platform 216, and a signal conditioning device 217.

The ACCS in FIG. 1 controls fuel flow to a combustor 30. The anti-aliasing/signal conditioning device accounts for sensor linearity, bandwidth, output (V or mA, etc.), and delay. The real time control platform 216 uses algorithms to control combustion dynamics, LBO, and emissions and provides an electrical signal to the signal conditioning device 217. The signal conditioning device 217 conditions the signal from the real time control platform 216 accounting for bandwidth, linearity, amplification, etc. and sends the appropriate voltage/current requirements (not pressure actuated) to the valve control electronics 203.

Figure 2:
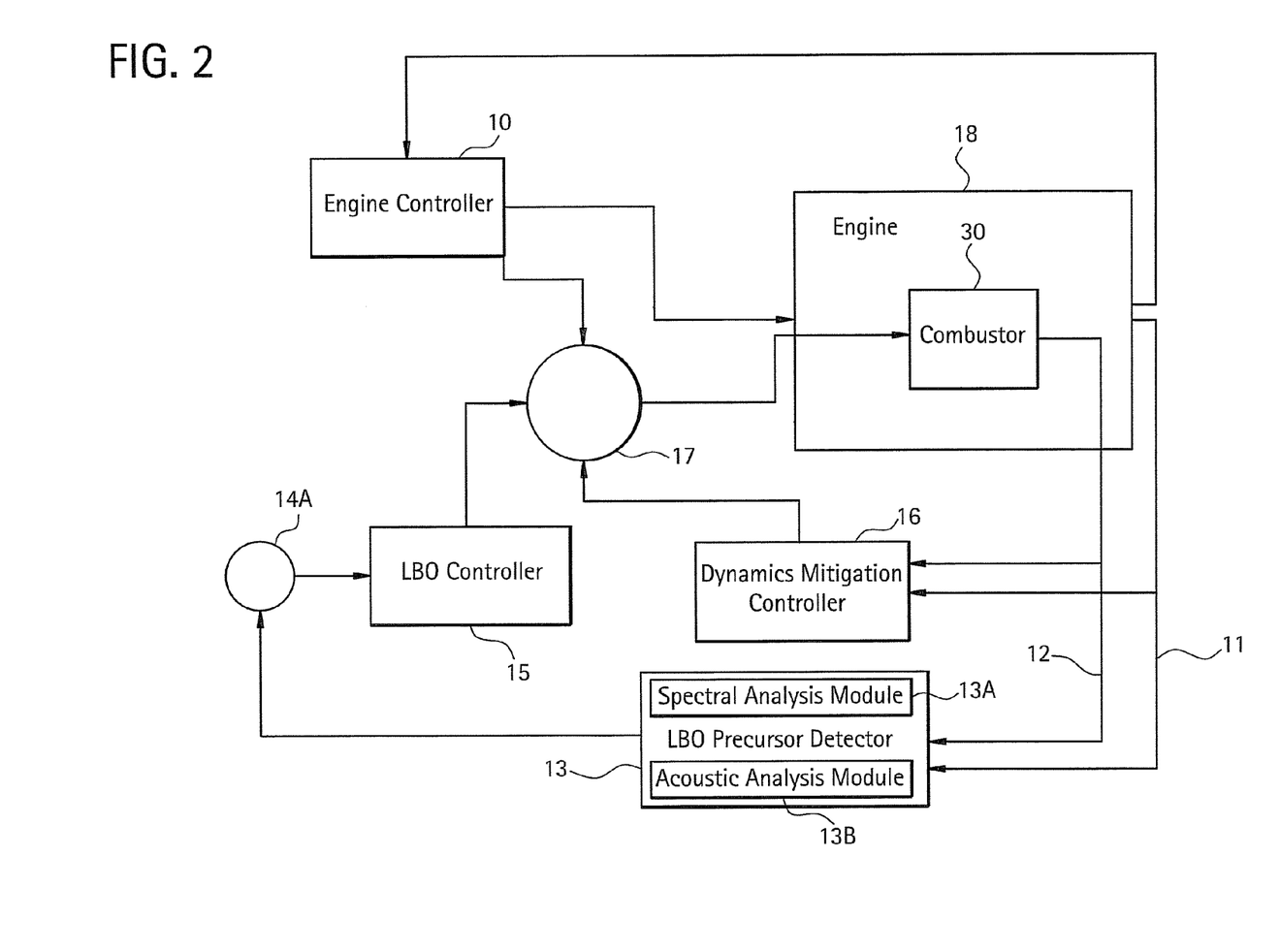
FIG. 2 is an illustration of the high level architecture of the Active Combustion Control System in accordance with the invention shown in FIG. 1.

Referring also to FIG. 2, the Active Combustion Control System works by detecting lean blowout precursors and combustion dynamics within the combustion chamber 30 through pressure measurements from a combustion diagnostic sensor 210 such as a pressure sensor. In response to pressure oscillations typical of the onset of LBO or unacceptable combustion dynamics, amplitude and frequency modulations of fuel flow through nozzle (FIG. 3, item 162) is made in accordance with the teachings herein to prevent LBO or combustion dynamics. The modulation of the fuel flow is made by a fuel modulation valve 202 on the pilot circuit of the nozzle. Fuel modulation valve 202 may include Micro-Electro-Mechanical Systems (MEMS)-based microvalves or macroscale valves. Flow rate modulations are measured with a downstream fuel flow sensor 204 and high temperature flow sensor readout electronics 203a in order to determine a signal within the high temperature environment. The control system simultaneously balances lean blow out avoidance, combustor dynamics mitigation and combustor operability.

Figure 3:
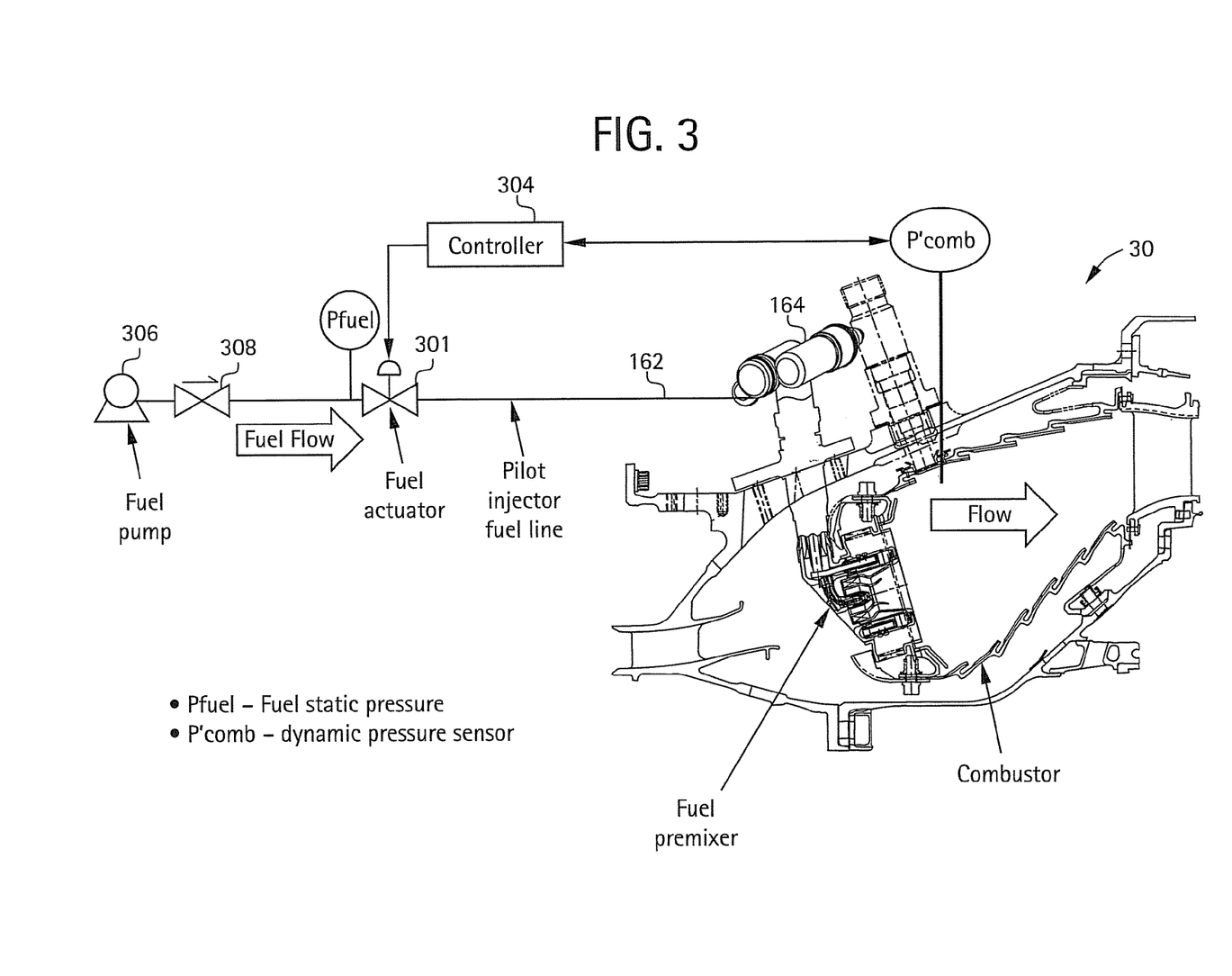
FIG. 3 is an illustration of a combustor and control setup in accordance with the invention shown in FIG. 1.

The fuel modulation valve 202 and the flow sensor 204 are located in the nozzle assembly while the diagnostic combustion sensor 210 is in the combustor 30. In a particular embodiment, the fuel modulation valve 202 is able to actuate at a 1 kHz frequency at an elevated temperature and is able to modulate a significant portion of the pilot flow. The flow sensor 204 has a bandwidth capable of detecting the flow modulations of the fuel modulation valve 202. The flow sensor readout electronics 203a associated with the flow sensor 204 are capable of measurements at elevated temperatures of about 200 C. so that it can be co-located with the flow sensor 204. In a particular embodiment, the combustion diagnostic sensor 210 has a bandwidth greater than 1 kHz in order to detect combustion instabilities in the combustor 30 while having the capability to sustain reliable operation in a harsh environment. Using the combustion diagnostic sensor 210 response along with control algorithms, the fuel modulation valve 202 will modulate the flow into the combustor 30.

The ACCS with fuel modulation system enables lower emission engines with less instability. It uses valve 202 that can operate at higher temperatures and at higher frequencies than conventional valves. The ACCS with fuel modulation system puts the small size flow sensor 204 in the system so that the flow pulsations and split levels can be monitored.

Referring to FIG. 2, there is shown a high level control architecture of the Active Combustion Control System (ACCS) in accordance with an embodiment of the present invention. The ACCS includes an engine controller 10, engine control sensors 11, combustion pressure dynamic sensors 12, a LBO Precursor Detection 13, a LBO Threshold Comparator 14, a LBO Controller 15, a Dynamics Mitigation Controller 16 and a Fuel Control System 17.

In FIG. 2, the ACCS controls an Engine 18 and Combustor 30 (See FIG. 1). The engine controller 10 modulates engine actuators (guide vanes, variable stator vanes, etc.) to achieve required performance while protecting engine against various constraints. The engine controller 10 also adjusts bulk fuel flow to meet engine performance requirements and pilot/cyclone fuel split for emissions.

Figure 10A:
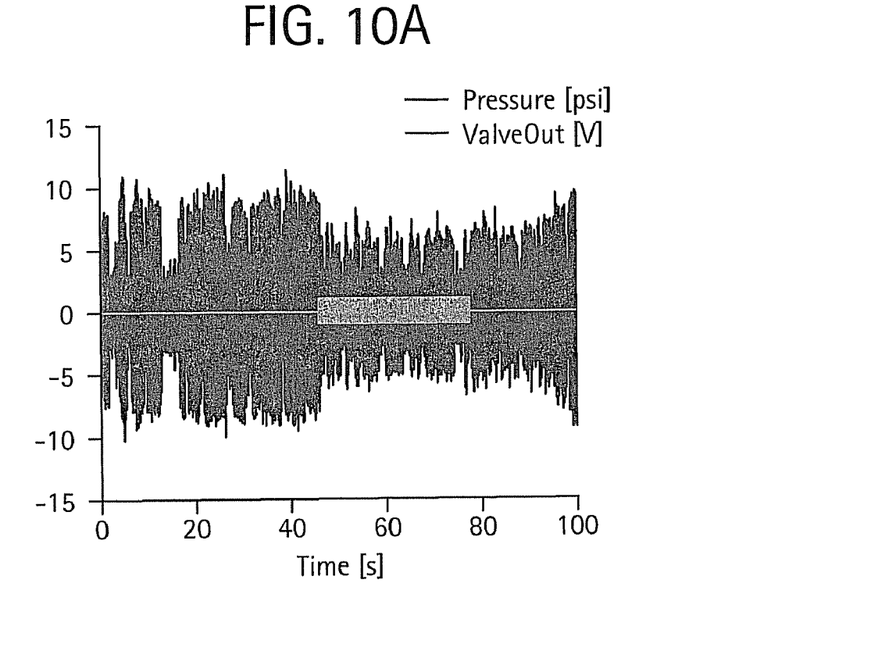
FIGS. 10A-10C shows data without and with fuel forcing.
Figure 10B:
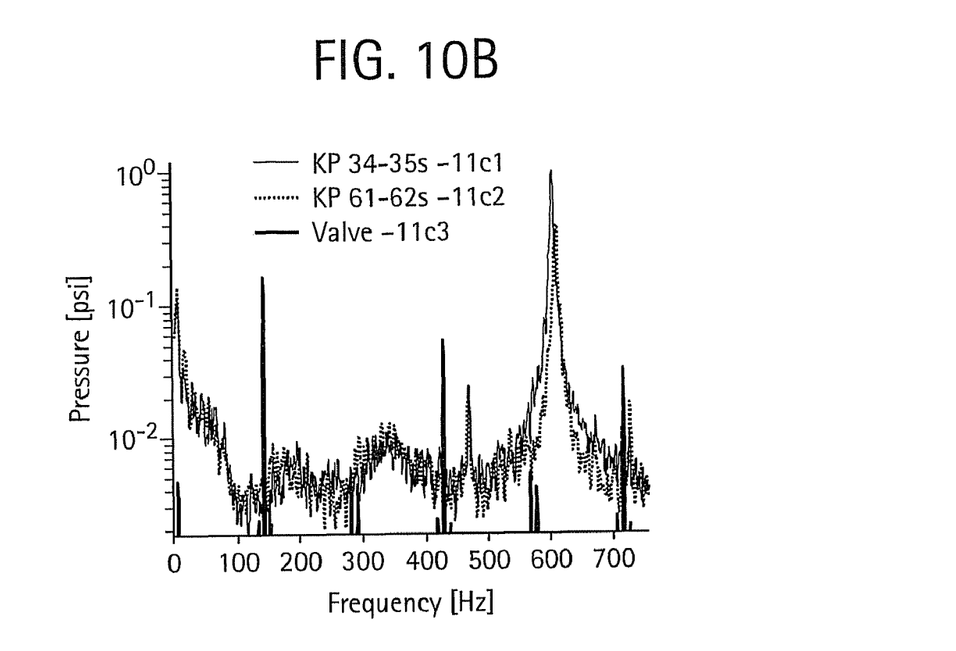
Figure 10C:
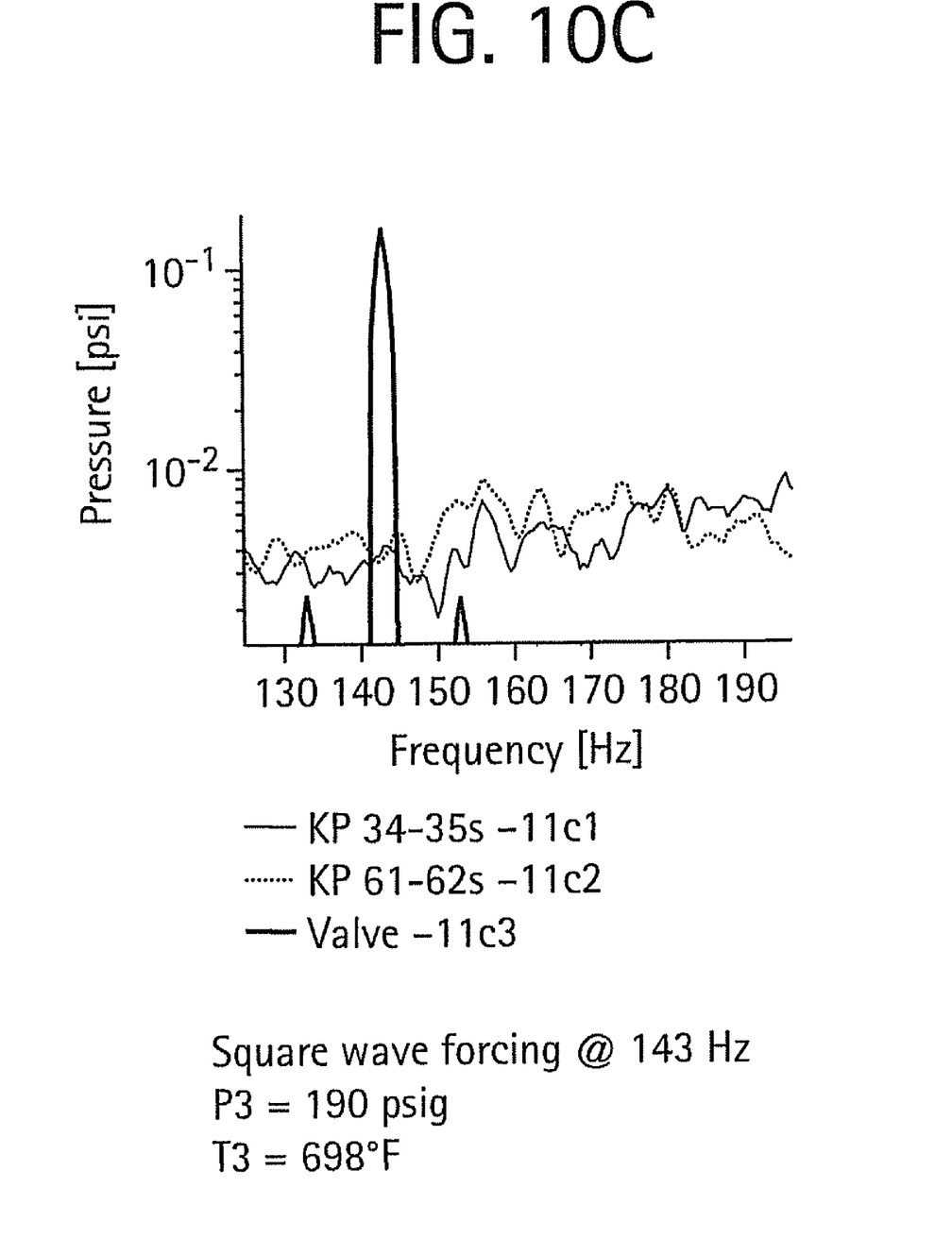

One embodiment of the control system performs a real time spectral analysis of the dynamic pressure signal 12 from the combustor pressure sensor to determine the main pressure frequency in the combustor 30, along with two minor sub-frequencies known as sympathetic frequencies (see FIGS. 8-10). In general, the main frequency is the sum of the two sub-frequencies. The control system then sends a command to the fuel modulator system enabling that system to inject a fraction of the total combustion fuel flow upstream of the fuel nozzle at a predetermined frequency and amplitude. This is known as fuel forcing.

The modulated frequency coincides with either the peak or adjacent valley of one of the sympathetic frequencies. The fuel modulation at the lower frequency adds energy at the lower frequency with the result of shifting the main combustor frequency towards the lower frequency. The net result is the cancellation or at the minimum, a reduction in the sound pressure level of the observed combustion dynamics. Fuel forcing is maintained, with changes made to the frequency and amplitude until the undesirable engine dynamics are canceled, or until an acceptable pre-determined minimum dynamics level is attained.

Referring to FIG. 2, there is shown an illustration of the high level architecture of the Active Combustion Control System in accordance with the invention shown in FIG. 1; In particular embodiments, the LBO controller 15 adjusts pilot/cyclone split via a MEMS valve 202 (refer to FIG. 3) or bulk fuel flow. The dynamics mitigation controller 16 modulates MEMS valve 202 to introduce Fuel/Air (F/A) ratio (hence heat release) perturbation to mitigate dynamics. The LBO precursor detection 13 employs signal processing and data fusion algorithms.

Referring to FIG. 3, there is shown a pictorial diagram of one embodiment of the present invention. Fuel pump 306 provides fuel through fuel flow device 308 to fuel actuator 301. Static pressure device 308A measures the static pressure of the fuel prior to the fuel entering fuel actuator 301 and pilot injector fuel line 162. A controller 304 controls fuel actuator 301 and also receives data from dynamic pressure sensor 308B. The fuel actuator 301 is able to control the frequency and amplitude of the fuel in the pilot injector fuel line 162. Pilot injector fuel line 162 is connected to combustor 30.

Figure 4:
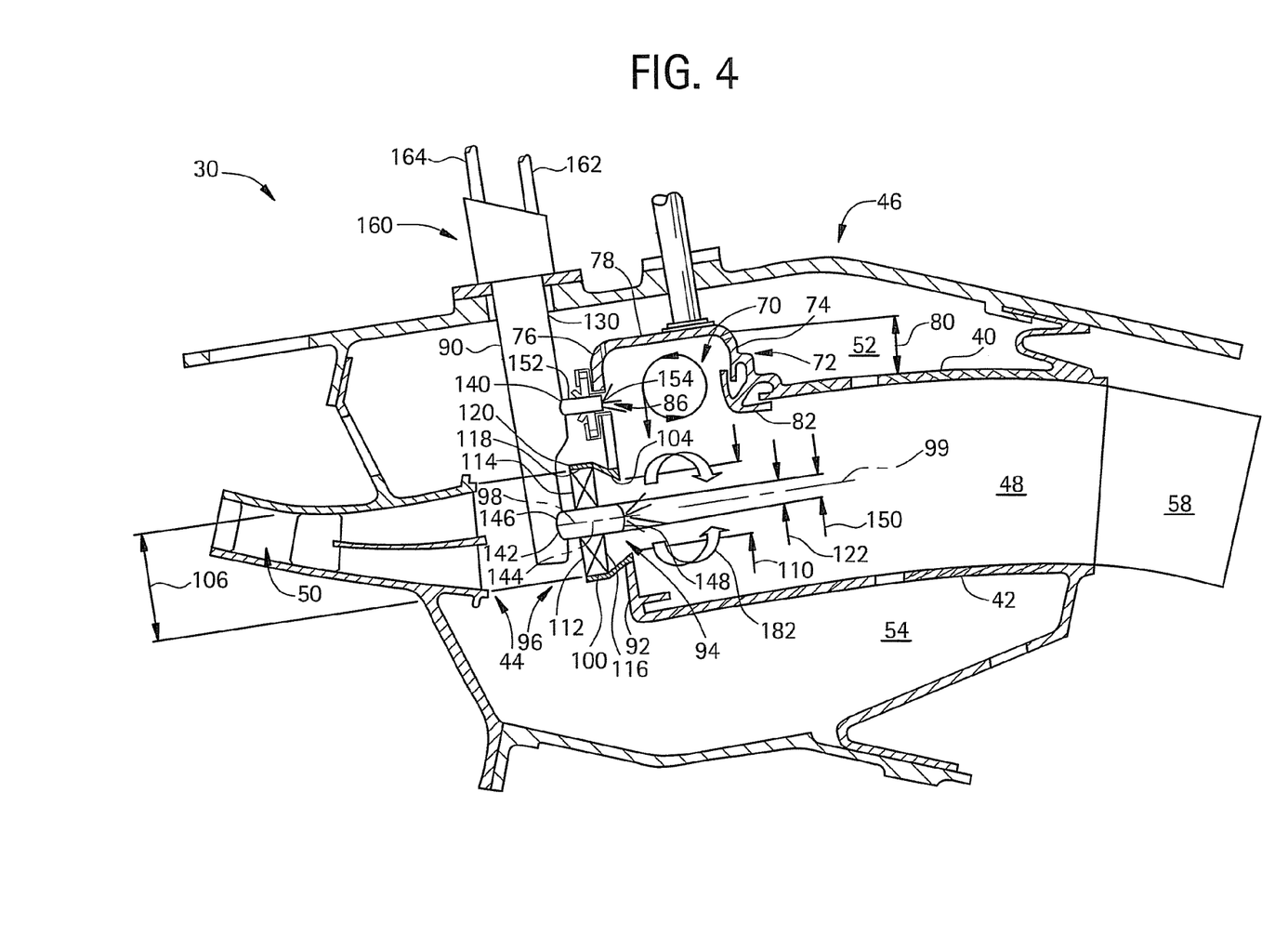
FIG. 4 is a cross-sectional view of a combustor used in accordance with the present invention shown in FIG. 1.

FIG. 4 is a cross-sectional view of a combustor 30 for use with a gas turbine engine. In one embodiment, the gas turbine engine is a GE F414 engine available from General Electric Company, Cincinnati, Ohio. This example is illustrative, and the invention is not limited to specific engine models or combustor designs. In the illustrated example, combustor 30 includes an annular outer liner 40, an annular inner liner 42, and a domed inlet end 44 extending between outer and inner liners 40 and 42, respectively. Domed inlet end 44 has a shape of a low area ratio diffuser.

Outer liner 40 and inner liner 42 are spaced radially inward from a combustor casing 46 and define a combustion chamber 48. Combustor casing 46 is generally annular and extends downstream from an exit 50 of a compressor, such-as compressor 14 shown in FIG. 4. Combustion chamber 48 is generally annular in shape and is disposed radially inward from liners 40 and 42. Outer liner 40 and combustor casing 46 define an outer passageway 52 and inner liner 42 and combustor casing 46 define an inner passageway 54. Outer and inner liners 40 and 42, respectively, extend to a turbine inlet nozzle 58 disposed downstream from diffuser 48.

A trapped vortex cavity 70 is incorporated into a portion 72 of outer liner 40 immediately downstream of dome inlet end 44. Trapped vortex cavity 70 has a rectangular cross-sectional profile and because trapped vortex cavity 70 opens into combustion chamber 48, cavity 70 only includes an aft wall 74, an upstream wall 76, and an outer wall 78 extending between aft wall 74 and upstream wall 76. In an alternative embodiment, trapped vortex cavity 70 has a non-rectangular cross-sectional profile. In a further alternative embodiment, trapped vortex cavity 70 includes rounded corners. Outer wall 78 is substantially parallel to outer liner 40 and is radially outward a distance 80 from outer liner 40. A corner bracket 82 extends between trapped vortex cavity aft wall 74 and combustor outer liner 40 and secures aft wall 74 to outer liner 40. Trapped vortex cavity upstream wall 76, aft wall 74, and outer wall 78 each include a plurality of passages (not shown) and openings (not shown) to permit air to enter trapped vortex cavity 70.

Trapped vortex cavity upstream wall 76 also includes an opening 86 sized to receive a fuel injector assembly 90. Fuel injector assembly 90 extends radially inward through combustor casing 46 upstream from a combustion chamber upstream wall 92 defining combustion chamber 48. Combustion chamber upstream wall 92 extends between combustor inner liner 42 and trapped vortex cavity upstream wall 76 and includes an opening 94. Combustion chamber upstream wall 92 is substantially co-planar with trapped vortex cavity upstream wall 76, and substantially perpendicular to combustor inner liner 42.

Combustor upstream wall opening 94 is sized to receive a mixer assembly 96. Mixer assembly 96 is attached to combustion chamber upstream wall 92 such that a mixer assembly axis of symmetry 98 is substantially co-axial with an axis of symmetry 99 for combustion chamber 48. Mixer assembly 96 is generally cylindrical-shaped with an annular cross-sectional profile (not shown) and includes an outer wall 100 that includes an upstream portion 102 and a downstream portion 104.

Mixer assembly outer wall upstream portion 102 is substantially cylindrical and has a diameter 106 sized to receive fuel injector assembly 90. Mixer assembly outer wall downstream portion 104 extends from upstream portion 102 to combustor upstream wall opening 94 and converges towards mixer assembly axis of symmetry 98. Accordingly, a diameter 110 of upstream wall opening 94 is less than upstream portion diameter 106.

Mixer assembly 96 also includes a swirler 112 extending circumferentially within mixer assembly 96. Swirler 112 includes an intake side 114 and an outlet side 116. Swirler 112 is positioned adjacent an inner surface 118 of mixer assembly outer wall upstream portion 102 such that swirler intake side 114 is substantially co-planar with a leading edge '120 of mixer assembly outer wall upstream portion 102. Swirler 112 has an inner diameter 122 sized to receive fuel injector assembly 90. In one embodiment, swirlers 112 are single axial swirlers. In an alternative embodiment, swirlers 112 are radial swirlers.

Fuel injector assembly 90 extends radially inward into combustor 16 through an opening 130 in combustor casing 46. Fuel injector assembly 90 is positioned between domed inlet end 44 and mixer assembly 96 and includes a pilot fuel injector 140 and a main fuel injector 142. Main fuel injector 142 is radially inward from pilot fuel injector 140 and is positioned within mixer assembly 96 such that a main fuel injector axis of symmetry 144 is substantially co-axial with mixer assembly axis of symmetry 98. Specifically, main fuel injector 142 is positioned such that an intake side 146 of main fuel injector 142 is upstream from mixer assembly 96 and a trailing end 148 of main fuel injector 142 extends through mixer assembly 96 radially inward from swirler 112 and towards combustor upstream wall opening 94. Accordingly, main fuel injector 142 has a diameter 150 that is slightly less than swirler inner diameter 122.

Pilot fuel injector 140 is radially outward from main fuel injector 142 and is positioned upstream from trapped vortex cavity upstream wall opening 86. Specifically, pilot fuel injector 140 is positioned such that a trailing end 154 of pilot fuel injector 140 is in close proximity to opening 86.

A fuel delivery system 160 supplies fuel to combustor 30 and includes a pilot fuel circuit 162 and a main fuel circuit 164 to control nitrous oxide emissions generated within combustor 30. Pilot fuel circuit 162 supplies fuel to trapped vortex cavity 70 through fuel injector assembly 90 and main fuel circuit 164 supplies fuel to mixer assembly 96 through fuel injector assembly 90. During operation, as gas turbine engine 10 is started and operated at idle operating conditions, fuel and air are supplied to combustor 30. During gas turbine idle operating conditions, combustor 30 uses only the pilot fuel stage for operating. Pilot fuel circuit 162 injects fuel to combustor trapped vortex cavity 70 through pilot fuel injector 140. Simultaneously, airflow enters trapped vortex cavity 70 through aft, upstream, and outer wall air passages and enters mixer assembly 96 through swirlers 112. The trapped vortex cavity air passages form a collective sheet of air that mixes rapidly with the fuel injected and prevents the fuel from forming a boundary layer along aft wall 74, upstream wall 76, or outer wall 78.

Combustion gases 180 generated within trapped vortex cavity 70 swirl in a counter-clockwise motion and provide a continuous ignition and stabilization source for the fuel/air mixture entering combustion chamber 48. Airflow 182 entering combustion chamber 48 through mixer assembly swirler 112 increases a rate of fuel/air mixing to enable substantially near-stoichiometric flame-zones (not shown) to propagate with short residence times within combustion chamber 48.

Figure 5:
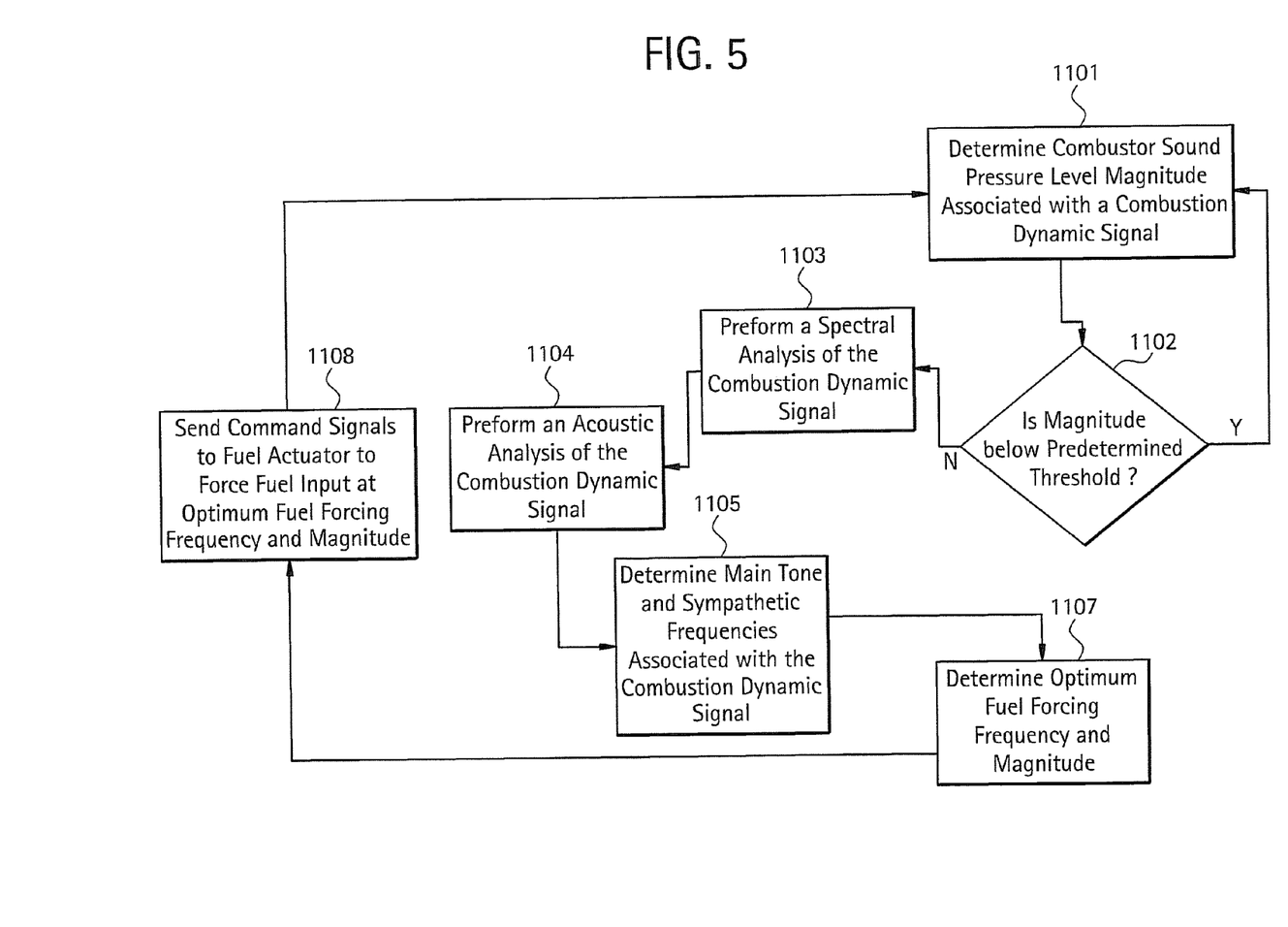
FIG. 5 is a flow chart showing the behavior of the active combustion control system in accordance with the invention shown in FIG. 1.
Figure 6:
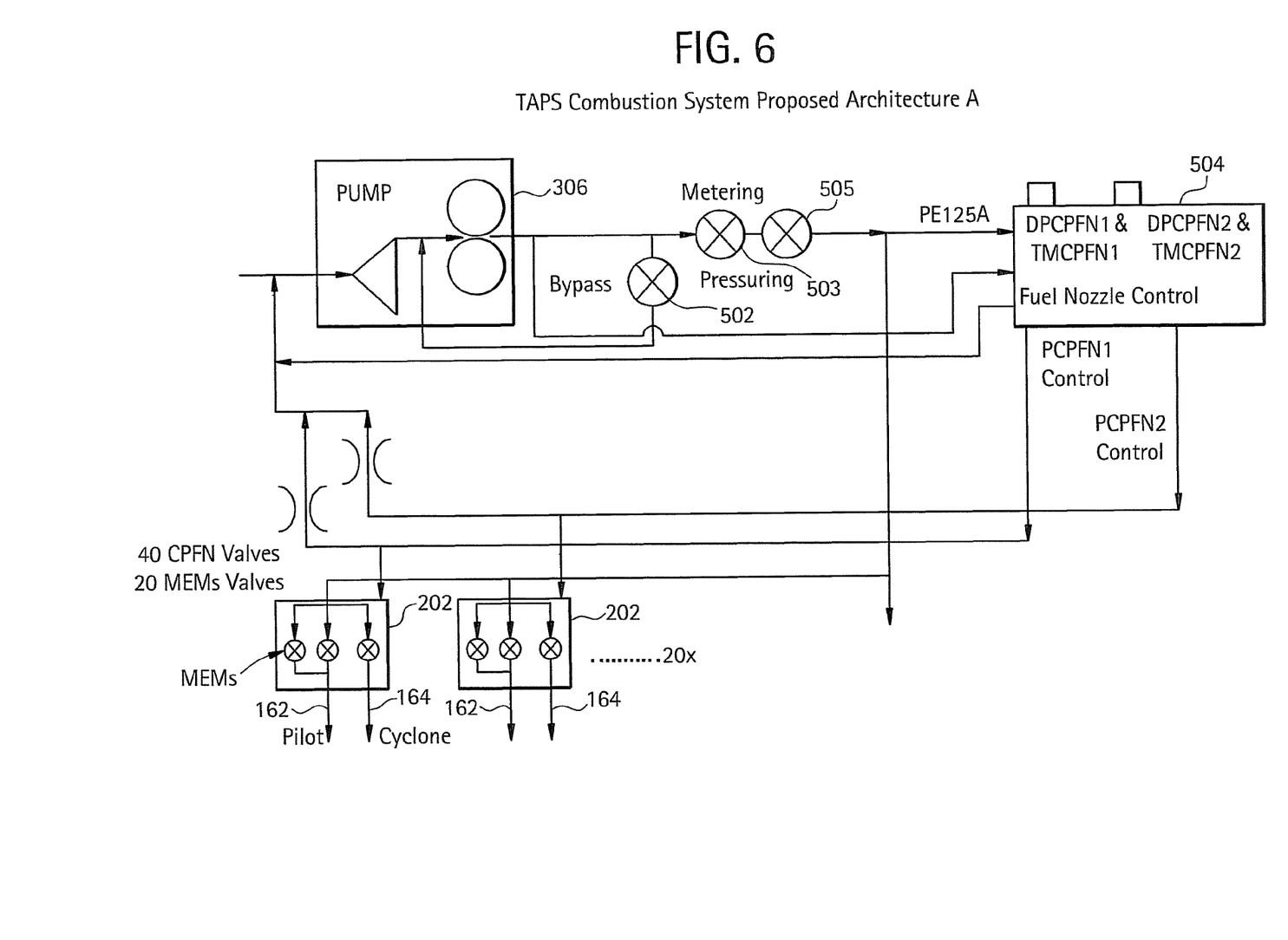
FIG. 6 is an illustration of an embodiment of MEMS for individual fuel nozzle flow trim/control.
Figure 7:
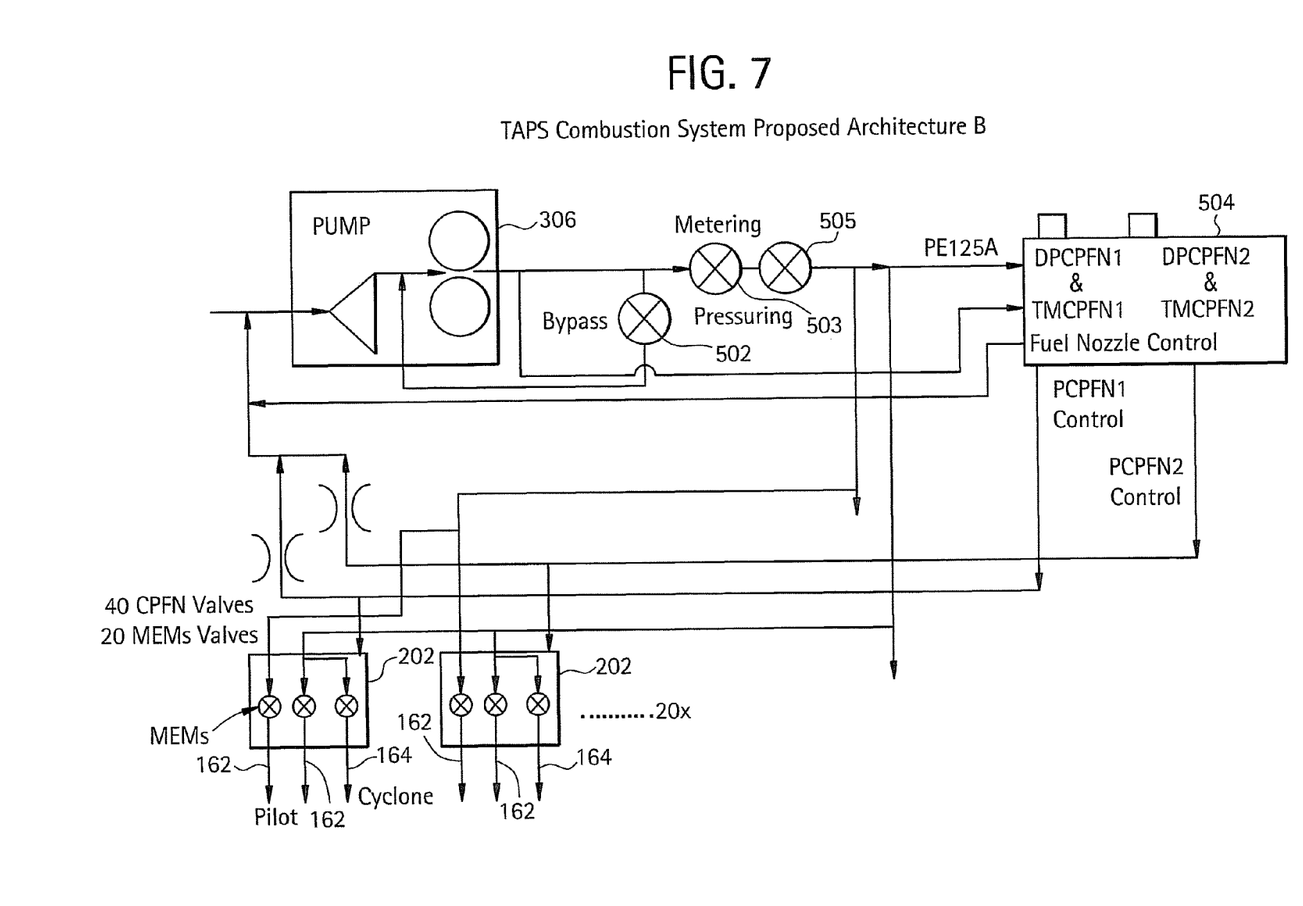
FIG. 7 is an illustration of another embodiment of MEMS for individual fuel nozzle trim/control.
Figure 8A:
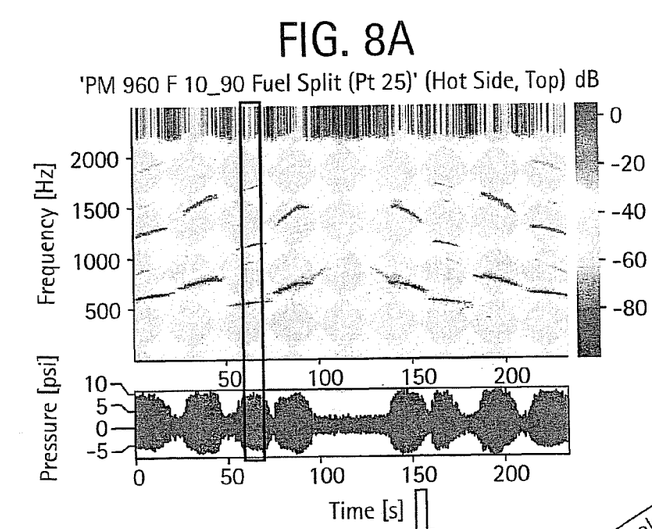
FIGS. 8A-8D presents graphs demonstrating the effects of fuel forcing.
Figure 8B:
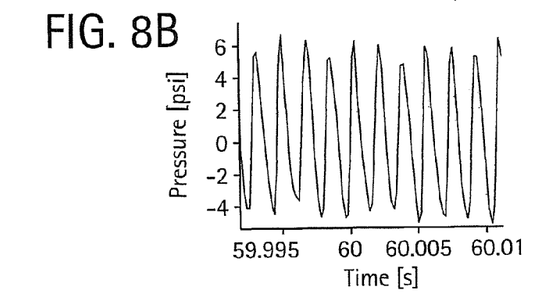
Figure 8C:
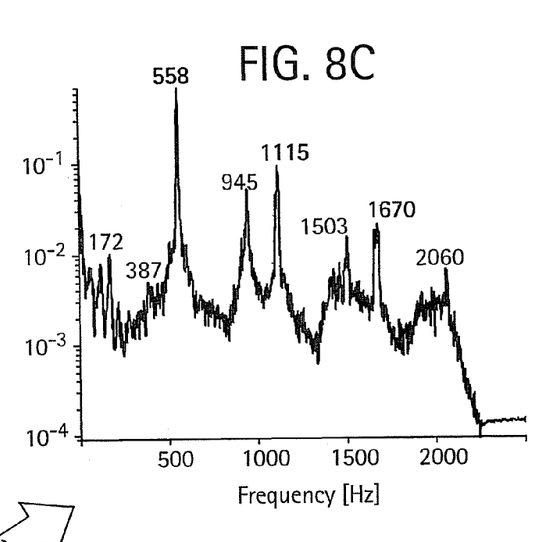
Figure 8D:
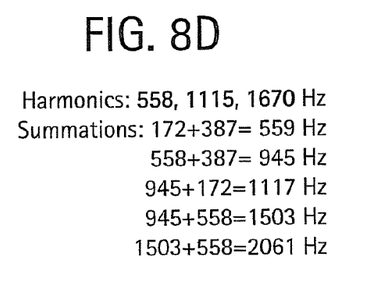
Figure 9A:
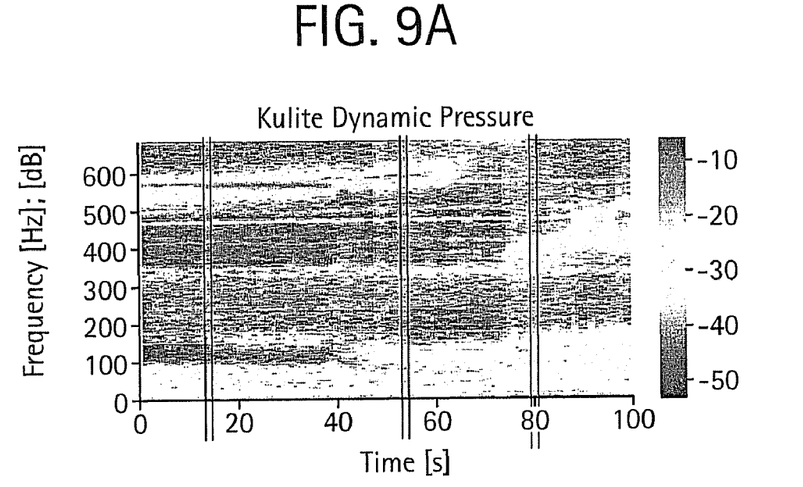
FIGS. 9A-9E shows a spectrogram of the frequency response of the combustor 30 with no fuel forcing.
Figure 9B:
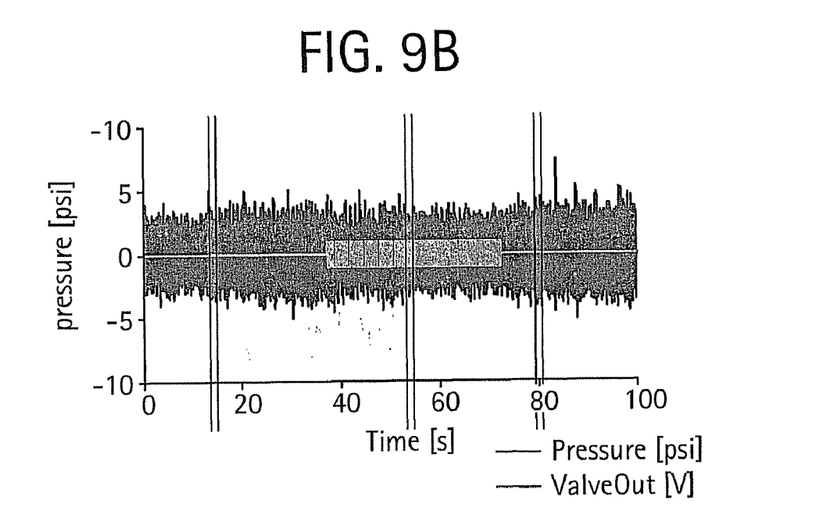
Figure 9C:
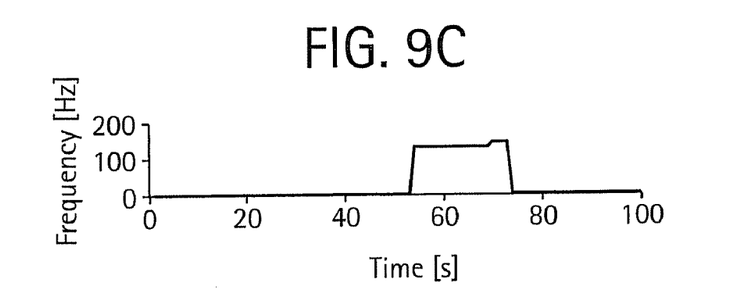
Figure 9D:
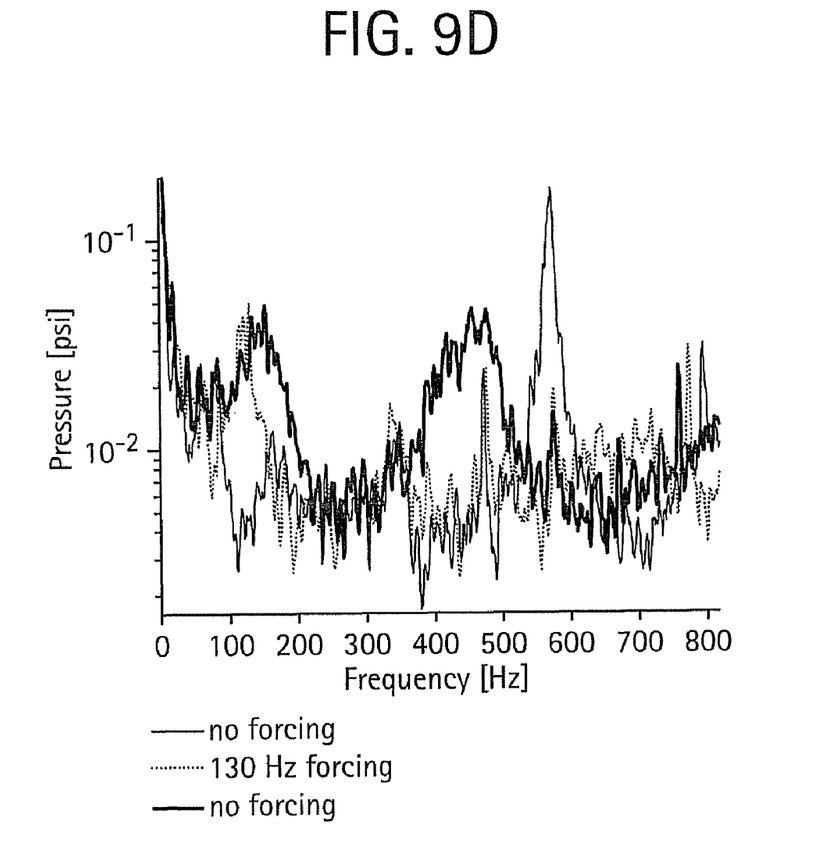
Figure 9E:
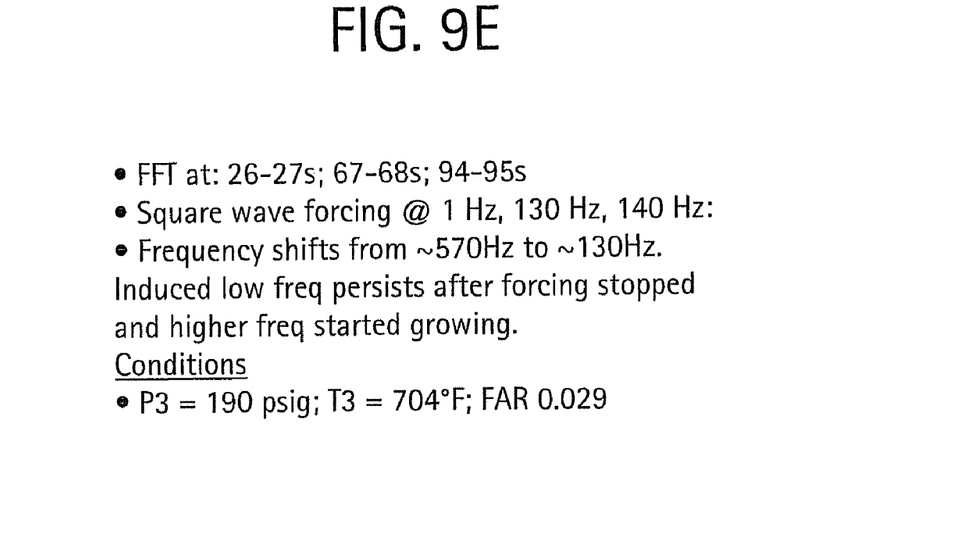

Referring to FIG. 5, there is shown a flow chart showing the behavior of the active combustion control system in accordance with the invention shown in FIG. 1. Sensors within or located substantially near combustor (FIG. 4, item 30) determine combustor sound pressure level magnitude associated with a combustion dynamic signal 1101.

A threshold comparator (FIG. 2. item 14A) determines 1102 if the magnitude is below a predetermined threshold. If the threshold comparator (FIG. 2. item 14A) determines the magnitude is below the predetermined threshold, control is passed back to the sensors for determining the combustor dynamic signal 1101.

If the threshold comparator (FIG. 2. item 14A) determines the magnitude is above the predetermined threshold control is passed to a spectral analysis module co-located within the lean-blow-out detector (FIG. 2, item 13A) for performing 1103 a spectral analysis of the combustor dynamic signal.

In addition an acoustic analysis module co-located within the lean-blow-out precursor detector (FIG. 2, item 13B) also performs 1104 an acoustic analysis of the combustor dynamic signal.

The lean-blow-out (LBO) precursor detector (FIG. 2, item 15) determines 1105 sympathetic frequencies associated with a dominant instability frequency of the combustor dynamic signal. It will be appreciated that the sympathetic frequencies are generally much lower frequency than the dominant instability frequency.

LBO controller (FIG. 2, item 15) determines 1107 an optimum fuel forcing frequency and magnitude based upon the sympathetic frequencies. LBO controller then sends 1108 command signals to MEMS fuel actuator (FIG. 1, item 202) to force fuel input to the combustor (FIG. 4, item 30) pilot input port (FIG. 4, item 162) at the determined optimum fuel forcing frequency and magnitude.

Experimental Results

Referring also to FIG. 3 there is shown a depiction of a test setup with a swirl stabilized combustor 30, a premixing fuel injector 308, a high-speed fuel actuator 301 and a controller 304. This setup is representative of that used on the tunable acoustic test rig (TCA) tests.

FIGS. 8A-8E show data from the TCA single nozzle test rig (e.g., FIG. 3) operating with a twin annular premixing swirler (TAPS) premixing fuel injector. The tests were run with liquid Jet-A fuel.

FIGS. 9A-9E shows a spectrogram of the frequency response of the combustor 30 with no fuel forcing. Shifts in the dominant frequencies that show up on the spectrogram are due to the changing length of the combustor section. Analysis of unforced TCA rig data shows fundamental, its harmonics (in red) and various sums and differences (in green) of these frequencies FIGS. 10A-10C shows data without and with fuel forcing. KP represents dynamic pressure signals, while valve shows the fuel actuator frequency command. A reduction in pressure fluctuation amplitude is shown from about 45 s when the fuel is actuated with a square wave at 143 Hz. This suppression is shown in the time domain from 45-75 s, after which the signal strength begins to build up again after the fuel forcing stopped.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An active combustion control system (ACCS) comprising:
    a combustor pressure sensor for measuring a dynamic pressure within a combustor;
    a Micro-Electro-Mechanical System (MEMS) microvalve adapted to modulate fuel flow into the combustor;
    a fuel flow sensor downstream of the microvalve and having a bandwidth capable of detecting modulations of the fuel flow of the MEMS microvalve; and
    a control system performing a real time spectral analysis of the dynamic pressure measured by the combustor pressure sensor and determining a main pressure frequency and at least one sympathetic frequency in the combustor,
    wherein the control system sends a signal to the MEMS microvalve to modulate fuel flow into the combustor at a frequency coinciding with the main pressure frequency or the at least one sympathetic frequency in response to pressure oscillations indicative of an onset of lean blow out (LBO) or unacceptable combustion dynamics within the combustor.

2. The ACCS as in claim 1 wherein the fuel flow sensor comprises a Micro-Electro-Mechanical System (MEMS) fuel flow sensor.

3. The ACCS as in claim 1 wherein the fuel flow sensor comprises a mass flow rate fuel flow sensor.

4. The ACCS as in claim 1 wherein the fuel flow sensor comprises a volumetric flow rate sensor.

5. The ACCS as in claim 1 further comprising an engine controller for determining flow rate from fuel flow sensor and adjusting a bulk fuel flow to meet predetermined engine performance requirements.

6. An apparatus for active control modulation of a flame in a combustor having instabilities, wherein the instabilities cause natural oscillation, the apparatus comprising:
    at least one actuator, wherein the at least one actuator periodically injects pulsed fuel into the combustor;
    a sensor connected to the combustion chamber down stream from an inlet, wherein the sensor generates a signal based on the pressure oscillations in the combustor;
    a Micro-Electro-Mechanical System (MEMS) microvalve adapted to modulate fuel flow into the combustor;
    a fuel flow sensor downstream of the microvalve and having a bandwidth capable of detecting modulations of the fuel flow of the MEMS microvalve; and
    a control system coupled to the at least one loop actuator and responsive to the sensor, the control system performing a real time spectral analysis of the dynamic pressure measured by the combustor pressure sensor and determining a main pressure frequency and at least one sympathetic frequency in the combustor,
    wherein the control system prompts the at least one actuator to periodically inject pulsed fuel into the combustor at the at least one sympathetic frequency and magnitude, and wherein the control system controls the amplitude of the pressure oscillations in the combustor by modulating the natural oscillations.

* * * * *